United States Patent
Seolas et al.

(10) Patent No.: US 9,203,720 B2
(45) Date of Patent: *Dec. 1, 2015

(54) MONITORING THE HEALTH OF WEB PAGE ANALYTICS CODE

(71) Applicant: ObservePoint LLC, Orem, UT (US)

(72) Inventors: Robert K. Seolas, Alpine, UT (US); John Pestana, Orem, UT (US); Tyler Broadbent, Lehi, UT (US); Richard A. Zinn, Murrieta, CA (US)

(73) Assignee: ObservePoint, Inc., Provo, UT (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/067,758

(22) Filed: Oct. 30, 2013

(65) Prior Publication Data

US 2014/0059219 A1    Feb. 27, 2014

Related U.S. Application Data

(63) Continuation of application No. 12/611,056, filed on Nov. 2, 2009, now Pat. No. 8,578,019.

(60) Provisional application No. 61/110,604, filed on Nov. 2, 2008, provisional application No. 61/110,603, filed on Nov. 2, 2008.

(51) Int. Cl.
*G06F 15/16* (2006.01)
*H04L 12/26* (2006.01)
(Continued)

(52) U.S. Cl.
CPC .......... *H04L 43/0876* (2013.01); *G06F 11/362* (2013.01); *G06F 11/3692* (2013.01); *G06F 17/30899* (2013.01)

(58) Field of Classification Search
CPC ............ G06F 11/3466; G06F 11/3636; G06F 2201/865; G06F 11/3644; G06F 11/3604; G06F 11/3476; G06F 11/3692; G06F 17/30899
USPC ................ 709/224, 223, 225; 714/47.1, 47.2, 714/47.3, 48
See application file for complete search history.

(56) References Cited

U.S. PATENT DOCUMENTS 5,870,559 A    2/1999    Leshem et al.
5,896,502 A    4/1999    Shieh et al.
(Continued)

OTHER PUBLICATIONS

USPTO, Office Action in U.S. Appl. No. 12/611,056, mailed Apr. 25, 2011, 20 pages.

(Continued)

*Primary Examiner* — Ruolei Zong
(74) *Attorney, Agent, or Firm* — Workman Nydegger

(57) ABSTRACT

A system for monitoring the "analytics health" or "tracking health" of a web page can include one or more modules that render analytics code on the web page. In one implementation, a monitoring service downloads one or more web pages from a web server. The monitoring service can attempt to render any analytics code on the web pages to see if the analytics code renders or executes as expected. The monitoring service can also perform basic text searches to identify analytics code, even if it cannot be rendered, and to determine if such code is present and correctly written in the web page. For web pages that require form input, the monitoring service can prompt the user for corresponding input, or retrieve pre-recorded user input from a store. The monitoring service can determine analytics health for web pages of interest in real-time.

20 Claims, 5 Drawing Sheets

(51) Int. Cl.
*G06F 11/36* (2006.01)
*G06F 17/30* (2006.01)

(56) References Cited

U.S. PATENT DOCUMENTS

| | | | |
|---|---|---|---|
| 5,960,429 | A | 9/1999 | Peercy et al. |
| 5,968,125 | A | 10/1999 | Garrick et al. |
| 5,970,472 | A | 10/1999 | Allsop |
| 6,226,618 | B1 | 5/2001 | Downs et al. |
| 6,393,479 | B1 | 5/2002 | Glommen et al. |
| 6,594,694 | B1 | 7/2003 | Najork et al. |
| 6,775,405 | B1 | 8/2004 | Zhu |
| 6,801,906 | B1 | 10/2004 | Bates et al. |
| 6,895,551 | B1 | 5/2005 | Huang |
| 6,963,874 | B2 | 11/2005 | Kasriel et al. |
| 6,976,218 | B2 | 12/2005 | Stanford-Clark |
| 7,171,618 | B2 | 1/2007 | Harrington et al. |
| 7,305,107 | B2 | 12/2007 | Harrington et al. |
| 7,349,867 | B2 | 3/2008 | Rollins et al. |
| 7,546,530 | B1 | 6/2009 | Shuster et al. |
| 7,562,222 | B2 | 7/2009 | Gasparini |
| 7,599,920 | B1 | 10/2009 | Fox et al. |
| 7,657,497 | B2 | 2/2010 | Nandy |
| 7,676,570 | B2 | 3/2010 | Levy et al. |
| 7,765,295 | B2 * | 7/2010 | Anastas et al. ............... 709/224 |
| 7,856,189 | B2 | 12/2010 | Ishibashi |
| 7,895,514 | B1 | 2/2011 | Edmunds |
| 7,904,662 | B2 | 3/2011 | Dumont |
| 8,112,316 | B2 | 2/2012 | Fei |
| 8,190,491 | B2 | 5/2012 | Greaves |
| 2001/0014839 | A1 | 8/2001 | Belanger et al. |
| 2003/0097429 | A1 | 5/2003 | Wu et al. |
| 2003/0177096 | A1 | 9/2003 | Trent et al. |
| 2003/0188194 | A1 | 10/2003 | Currie et al. |
| 2004/0054589 | A1 | 3/2004 | Nicholas et al. |
| 2004/0128534 | A1 | 7/2004 | Walker |
| 2004/0268233 | A1 | 12/2004 | Okumura et al. |
| 2005/0033926 | A1 | 2/2005 | Dumont |
| 2005/0086643 | A1 | 4/2005 | Shane |
| 2005/0228899 | A1 | 10/2005 | Wendkos et al. |
| 2005/0229111 | A1 | 10/2005 | Makela |
| 2005/0267872 | A1 | 12/2005 | Galai et al. |
| 2006/0070022 | A1 | 3/2006 | Ng et al. |
| 2007/0016960 | A1 | 1/2007 | Glaser |
| 2007/0061384 | A1 | 3/2007 | Harrington et al. |
| 2007/0130546 | A1 | 6/2007 | Harris et al. |
| 2007/0245249 | A1 * | 10/2007 | Weisberg ............... 715/758 |
| 2007/0245343 | A1 | 10/2007 | Shannon |
| 2007/0299964 | A1 | 12/2007 | Wong et al. |
| 2008/0010142 | A1 | 1/2008 | O'Brien et al. |
| 2008/0092040 | A1 | 4/2008 | Nakamura |
| 2008/0263005 | A1 | 10/2008 | McLean et al. |
| 2009/0100154 | A1 * | 4/2009 | Stevenson et al. ............ 709/220 |
| 2009/0204900 | A1 | 8/2009 | Champion et al. |
| 2010/0042613 | A1 | 2/2010 | Malden |
| 2010/0153217 | A1 | 6/2010 | Kirkby et al. |
| 2010/0220923 | A1 | 9/2010 | Davan et al. |
| 2010/0306389 | A1 | 12/2010 | Mu et al. |
| 2011/0035486 | A1 | 2/2011 | Seolas et al. |
| 2011/0041090 | A1 | 2/2011 | Seolas et al. |
| 2011/0078557 | A1 | 3/2011 | Seolas et al. |

OTHER PUBLICATIONS

USPTO, Final Office Action in U.S. Appl. No. 12/611,056, mailed Aug. 29, 2011, 23 pages.
USPTO, Advisory Action in U.S. Appl. No. 12/611,056, mailed Nov. 3, 2011, 5 pages.
USPTO, Office Action in U.S. Appl. No. 12/611,058, mailed Sep. 26, 2011, 28 pages.
USPTO, Notice of Allowance in U.S. Appl. No. 12/611,058, mailed Dec. 6, 2011, 13 pages.
USPTO, Office Action in U.S. Appl. No. 12/911,626 mailed Dec. 2, 2011, 28 pages.
Dodds; Schemetron: Validating XML Using XSLT; Apr. 2001; ldodds.com; pp. 1-17.
St. Laurent; On Display: XML Web Pages with Mozilla; Mar. 29, 2000; XML.com; pp. 1-10.
Farley; Creating Tracking Images for asp.net; Jun. 10, 2004; ryanfarley.com; pp. 1-4.
International Preliminary Report on Patentability for PCT/US2012/022908 mailed Aug. 8, 2013.

* cited by examiner

FIG. 3

MONITORING THE HEALTH OF WEB PAGE ANALYTICS CODE

CROSS-REFERENCE TO RELATED APPLICATIONS

This application is a continuation of U.S. patent application Ser. No. 12/611,056 filed on Nov. 2, 2009, entitled "MONITORING THE HEALTH OF WEB PAGE ANALYTICS CODE," which issued as U.S. Pat. No. 8,578,019 on Nov. 5, 2013, which claims the benefit of priority to Provisional Application No. 61/110,603, filed Nov. 2, 2008, entitled "MONITORING PAGE TRACKING CODE WITH AUTOMATED PAGE RENDERING," and to U.S. Provisional Application No. 61/110,604, filed Nov. 2, 2008, entitled "GENERATING A SITE MAP WITH AUTOMATED PAGE LOADING." The entire contents of each of the aforementioned applications are incorporated by reference in their entirety herein.

BACKGROUND OF THE INVENTION

1. The Field of the Invention

This invention relates to systems, methods, and computer program products related to website analytics.

2. Background and Relevant Art

Websites are increasingly more common and important for organizations to convey information to clients, or otherwise provide goods and services for sale to customers. As such, organizations typically take great interest to identify the effectiveness of their websites: i.e., whether the efforts and resources they dedicate to providing web content have the desired effect. One way to gauge effect is to determine how often others are visiting particular web pages, when are others visiting the web pages, and who is visiting the web pages. There are a wide range of mechanisms for tracking this type of information, and such mechanisms range in complexity.

For example, more rudimentary analytics code employs mechanisms for tracking web page visits ("traffic") such as a simple counter that increments each time another computer system requests the given web page from the web server. Such mechanisms can tell an organization whether a particular web page has more traffic compared with another web page, but any additional information beyond that tends to be fairly limited. By contrast, more complex analytics code employs mechanisms for monitoring web page requests using a "tracking pixel." In short, a tracking pixel is an image file (or other small file) that a computer system requests for display in a user interface, such as a web browser. This request occurs when the computer system processing the web page encounters and executes the analytics code containing the tracking pixel request.

Since the file associated with the tracking pixel is typically only very small (e.g., one pixel by one pixel), the request itself for the tracking pixel file tends to be much more important than display of the image file itself (Conventional tracking pixels are transparent pixels that are never seen). Conventional tracking pixel requests can comprise a wide range of settings and variables that allows organizations to make complex determinations about the end user. As a result, analysis of tracking pixel requests can provide, among other things, information about who is making web page requests, when or where such web page requests were made, and what other web pages the end user viewed before or after downloading the web page with the tracking pixel.

Unfortunately, there are a number or difficulties that can befall use of such analytics code (i.e., tracking pixel requests, etc.), regardless of complexity. Such difficulties generally relate to failure of the client system to properly request and execute the analytics code. For example, there may be an error in other source code that causes the client to stop downloading and rendering the remaining code on the web page before encountering the tracking pixel. In other cases, the source code which generates the request for the tracking pixel may have been removed, truncated or misspelled, or the variables in the code outdated.

Compounding these difficulties is the notion that many organizations now generate web pages automatically upon request by a client computer system. The existence of analytics code on the created web page thus often depends on the database being up to date, and/or that the instructions used by the server to generate the webpage are also designed correctly and up to date. One will appreciate that failure by a client computer system to receive and/or render analytics code can cause a website owner to believe interest has been lost in a certain web page, while the contrary may actually be the case.

Conventional mechanisms for monitoring the presence of correct analytics code are generally manual in nature, and often include technically-trained people reviewing code on variously identified web pages (or code for generating web pages) to identify errant code, or the potential for errant code. Not only are such mechanisms very expensive, but they are often error prone, and may often generate a significant number of false positives. For example, conventional mechanisms (e.g., using text searching) may be able to determine that the tracking pixel code is correctly written—or positioned on a web page in the correct place—but may otherwise be unable to determine that the tracking pixel code will work as intended by missing other failures in the source code.

Accordingly, there are a number of problems in the art that can be addressed.

BRIEF SUMMARY OF THE INVENTION

Implementations of the present invention provide systems, methods, and computer program products configured to accurately and efficiently monitor the health of analytics code on web pages of interest. In at least one implementation, for example, a system can be configured to render and/or execute analytics code on a web page. In another implementation, the system can also be configured to search and review for the presence and context of the analytics code on a web page. In at least one implementation, rendering the web page code allows an organization to determine whether the analytics code can be executed at all, and/or if the analytics code can be executed as intended.

For example, a computerized method of automatically monitoring the presence and function of the analytics code on one or more web pages of interest can involve identifying a set of one or more web pages to monitor for an analytics health value. The method can also involve receiving from a web server at least one of the one or more web pages. In this case, the at least one web page comprises source code related to one or more website analytics objects. In addition, the method can involve rendering the source code of the at least one web page thereby creating rendering results. Furthermore, the method can involve automatically providing an analytics health value for the at least one web page based at least in part on the rendering results.

In addition to the foregoing, a method of automatically using stored workflow information to identify the presence and function of the analytics code on one or more web pages of interest can involve receiving from a web server at least one of the one or more web pages. In this case, the at least one web page comprises source code related to one or more website analytics objects. The method can also involve identifying one or more forms that need to be completed before at least one of the one or more web pages can be rendered completely. In addition, the method can involve automatically filling in the one or more forms with data corresponding to one or more stored workflows. Furthermore, the method can involve automatically providing an analytics health value for one of the web pages based at least in part on one or more website analytics objects that were rendered as a result of filling in the one or more forms.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an exemplary user interface for recording workflow information for use by the monitoring system of FIG. 1;

DETAILED DESCRIPTION OF THE PREFERRED EMBODIMENTS

The present invention extends to systems, methods, and computer program products configured to accurately and efficiently monitor the health of analytics code on web pages of interest. In at least one implementation, for example, a system can be configured to render and/or execute analytics code on a web page. In another implementation, the system can also be configured to search and review for the presence and context of the analytics code on a web page. In at least one implementation, rendering the web page code allows an organization to determine whether the analytics code can be executed at all, and/or if the analytics code can be executed as intended.

In addition, one will appreciate more fully after reading the disclosure and claims herein that a monitoring service in accordance with implementations of the present invention can be configured in a number of ways. For example, the monitoring service can be configured to monitor the analytics code of particular web pages in real-time, such as by processing select web pages every few seconds or minutes, as desired. In addition, the monitoring service can be configured to evaluate a large number or type of analytics "objects," such as code for tracking pixels, code used for metatags, and other executable scripts that are used in some way to provide rich information about website usage. In addition, one will appreciate that such analytics objects can include various web page "signatures," which can include a particular layout, arrangement, or usage and value of variables in the analytics code itself, or even in a given overall web page.

Furthermore, implementations of the present invention provide a number of features that allow a monitoring service to process web pages that might ordinarily hinder or halt rendering. In particular, and as discussed more fully herein, the monitoring service can record user input in one or more forms or workflows, and reuse that input where appropriate. This can allow the monitoring service to at least access or discover any possible analytics code on a given web page, particularly that code that might not be discoverable until filling something like a user name and password. Accordingly, implementations of the present invention allow a monitoring service to both access and determine the validity of analytics code on a web page in a relatively robust, accurate, and efficient manner.

Figure 1:
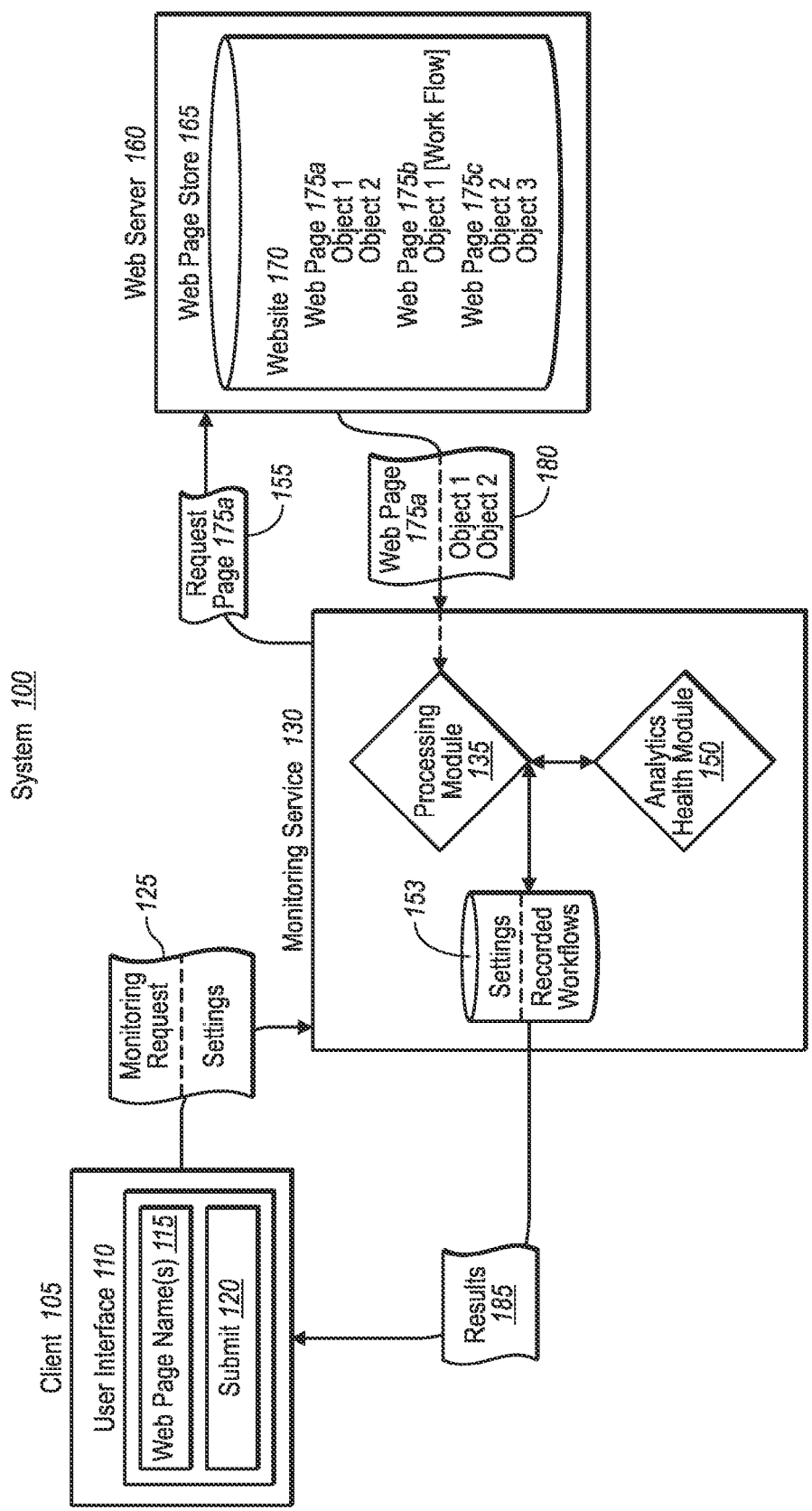
FIG. 1 illustrates an overview schematic diagram of a system in accordance with an implementation of the present invention in which a monitoring service determines analytics code health of one or more web pages of interest.

FIG. 1 illustrates an overview schematic diagram of a system 100 in which a monitoring service 130 determines analytics code health of one or more web pages 175. As a preliminary matter, one will appreciate that the architectural layout show in FIG. 1 is only one possible implementation of the present invention, and this layout is not required in all cases. For example, FIG. 1 shows that monitoring service 130 is in communication with client 105 and web server 160, such as via one or more network connections. In the illustrated case, therefore, monitoring service 130 can comprise a third party analytics service.

Alternatively, one will appreciate that monitoring system 130 can comprise one or more sets of components and modules that reside and/or are installed on web server 160, and/or on client 105. For example, user interface 110 at client 105 can comprise a conventional browser program (e.g., INTERNET EXPLORER, SAFARI, MOZILLA, FIREFOX, etc.). In addition, user interface 110 can further comprise one or more browser request and/or rendering modules as plugins. For example, user interface 110 can comprise an INTERNET EXPLORER web browser configured with one or more plugins that perform the functions described below for monitoring service 130.

In addition, one will appreciate that the end user can access user interface 110 through any number of means, mechanisms, or devices. In one implementation, for example, the user can invoke the user interface 110 using a client 105 executable application, which, in some cases, can further result in a set of requests and responses with monitoring service 130 to provide or enable use of user interface 110

(graphical or otherwise). In another implementation, the user accesses user interface 110 using an internet-enabled application that requests executable code from monitoring service 130 through a mobile phone or other PDA (Personal Digital Assistant), a laptop, or other specialized computing device.

FIG. 1 shows that web server 160 and monitoring service 130 can comprise one or more components and/or processing modules that store, process and/or otherwise handle the requests executed through user interface 110. For example, FIG. 1 shows that web server 160 can comprise one or more local or remote web page stores 165 for hosting various one or more websites 170. For purposes of this specification and claims, a website 170 will be understood as a collection of web pages 175 that are stored on or otherwise accessible through web server 160. In most cases, the web server 160 and corresponding website(s) 170 and/or web pages 175 will be that which the end-user owns or operates.

In addition, FIG. 1 shows that monitoring service 130 can comprise one or more processing modules 135, one or more analytics health modules 150, and one or more website settings stores 153. In general, processing module 135 can comprise one or more sets of computer-executable instructions for processing analysis (e.g., site-mapping) requests and for analyzing web page code. Similarly, analytics health module 150 can comprise one or more sets of computer-executable instructions for calculating one or more health values for the analytics code uncovered or processed by processing module 135. In addition, website settings store 153 can comprise storage of any user-provided settings and user-provided input, which the processing module 135 or analytics health module 150 can use to monitor and evaluate the requested web page(s).

Thus, when a user desires to analyze the analytics code of one or more web pages 175, the end user can effectively engage monitoring service 130 through user interface 110. Along these lines, FIG. 1 shows that user interface 110 can provide the end-user with one or more options for analyzing a particular set of one or more web pages 175. For example, FIG. 1 shows that the presented user interface 110 can comprise at least a modifiable web page field 115, and a submit button 120. In additional or alternative implementations, the user interface 110 can comprise one or more fields with respect to monitoring frequency. For example, the user interface 110 can comprise one or more fields (not shown) that allow the user to provide a number of various settings or other inputs that can be used in the web page analysis.

Such fields can allow a user to select tracking of analytics code on the specified web pages every few seconds (e.g., real-time), minutes, hours, or shorter or longer times, as required. Such fields can also allow the user select the types of web analytics code to track, such as a particular style, format, or construction of tracking pixel, metatag, executable script, a link thereto, or the like. In addition, and as understood more fully with respect to FIG. 3, the user interface 110 can also provide a number of fields that allow a user to record form (or workflow) fill-in information to be used on the appropriate web pages.

In any event, FIG. 1 shows that the user has selected or entered one or more web page name(s) in one or more fields 115 (only one field is shown for purposes of convenience). In at least one implementation, the identified web page name(s)s have been previously identified by the owner/operator of a website as pages for which the owner has inserted analytics code, such as tracking code. For example, although not shown, the website owner may have previously submitted a list of domain names (and/or sequence thereof, described hereinafter as a "flow") and specific uniform resource identifiers (URIs) of web pages containing such analytics code. The website owner may also have submitted specific tracking code verbiage used in the web page(s) of interest.

One will appreciate that the end user's entries into the one or more fields 115 can take on any number or type of formats, such as a uniform resource identifier (www.mywebsite.com/page1.htm) for each web page. In other cases, another field (not shown) in user interface 110 can allow a user to specify the domain for a website 170, and then list the set of web pages in which the user is specifically interested (e.g., mywebsite.com; page1.htm, page1.htm, page3.htm, etc.) Of course, one will appreciate that the user can additionally or alternatively supply a general website name (e.g., mywebsite.com), and allow the monitoring service 130 to simply scan and find all web pages 175 in the website 170 that are identified as containing any web analytics code.

Upon selecting the website and/or web page(s) of interest, FIG. 1 further shows that the user can then execute the request to monitor the same by selecting the submit button 120. Selecting the submit button 120 in this case results in client 105 sending one or more requests 125 to monitoring service 130 for handling. In the illustrated implementation, request 125 includes not only the request to monitor the website or selected web pages, but also includes one or more sets of settings as described above, such as monitoring frequency, fill-in form data, or the like. One will appreciate, however, that the user and/or client system can submit this and other information to monitoring service 130 over several sets of successive messages. Moreover, one will appreciate that previously sent settings and fill-in form data may not need to be sent or resent again in all cases.

FIG. 1 shows that processing module 135 can receive the request 125 and begin processing. As part of this processing, monitoring service 130 stores any settings (e.g., new or updated) in the one or more messages 125 in settings store 153. In addition, FIG. 1 shows that monitoring service 130 sends one or more corresponding requests (e.g., at the appropriate time indicated by the end user or client 105) to web server 150. For example, processing module 135 identifies that web server 150 is the host for the website and/or web page(s) indicated in message 125. Monitoring service 130 then sends message 155 to web server 160, wherein message 155 requests a particular web page, or set of web pages 175. Web server 150 then responds with one or more messages 180 comprising source code for the requested web pages.

FIG. 1 shows that monitoring service 130 processes the received source code in messages 180 via one or more of processing module 135 and analytics health module 150. In some cases, such processing can include processing module 135 retrieving or otherwise referring to one or more settings and recorded workflows (e.g., stored fill-in form data) in settings store 153. In addition, such processing can include analytics health module 150 determining a health value corresponding to the review and/or processing of one or more analytics "objects" in the received one or more web pages 175.

For purposes of this specification and claims, an "object" or "analytics object" means any source code, links to source code, any executables, or any links to any of the foregoing, and any portion thereof, which the monitoring service 130 uses to identify use information for web content, or for specific web pages. For example, a tracking pixel file, a set of one or more metatags, a PERL, JAVA, or JAVASCRIPT executable that relays use information, or any references in a web page to the same, can each comprise an analytics object. In addition, an analytics object can comprise a "signature."

For example, the monitoring service 130 can develop a base signature for each website owner's various web pages 175 of interest. The base signature can comprise a combination of different indicia related primarily to the format of various code content on the web page 175. Such signatures can include information that relates, for example, to a base domain, transfer protocol, path, query string found in the web page source code, or the like. In such a case, the processing module 135 could compare the code received from the web server 160 to identify if any known signatures for this particular website owner are present in the downloaded web page 175 of interest. Accordingly, one will appreciate that a web page can comprise—or have reference to—multiple analytics objects in its source code. This is true whether or not the code executed for the web page is directly written in the web page source code itself, or is accessed at the time of processing/execution via a remote link, such as in the case with tracking pixels or automatically generated off-site content.

Along these lines, FIG. 1 shows that website 170 comprises multiple web pages 175*a*, 175*b*, and 175*c*, which each have at least one analytics object. In the illustrated example, web page 175*a* comprises "object 1," and "object 2," while web page 175*b* comprises only "object 1." In addition, FIG. 1 shows that web page 175*c* comprises "object 2," and "object 3." For example, object 1 might comprise analytics code for a tracking pixel, reference to a remote tracking pixel file, or code that generates a reference to a tracking pixel; while, object 2 might comprise analytics code for one or more metatags. Similarly, object 3 might comprise one or more references to dynamic content, such as a reference to a filename request for automatically generated content. Accordingly, FIG. 1 shows that receipt of message 180, which includes the source code for web page 175*a*, also includes analytics objects 1 and 2.

Figure 2:
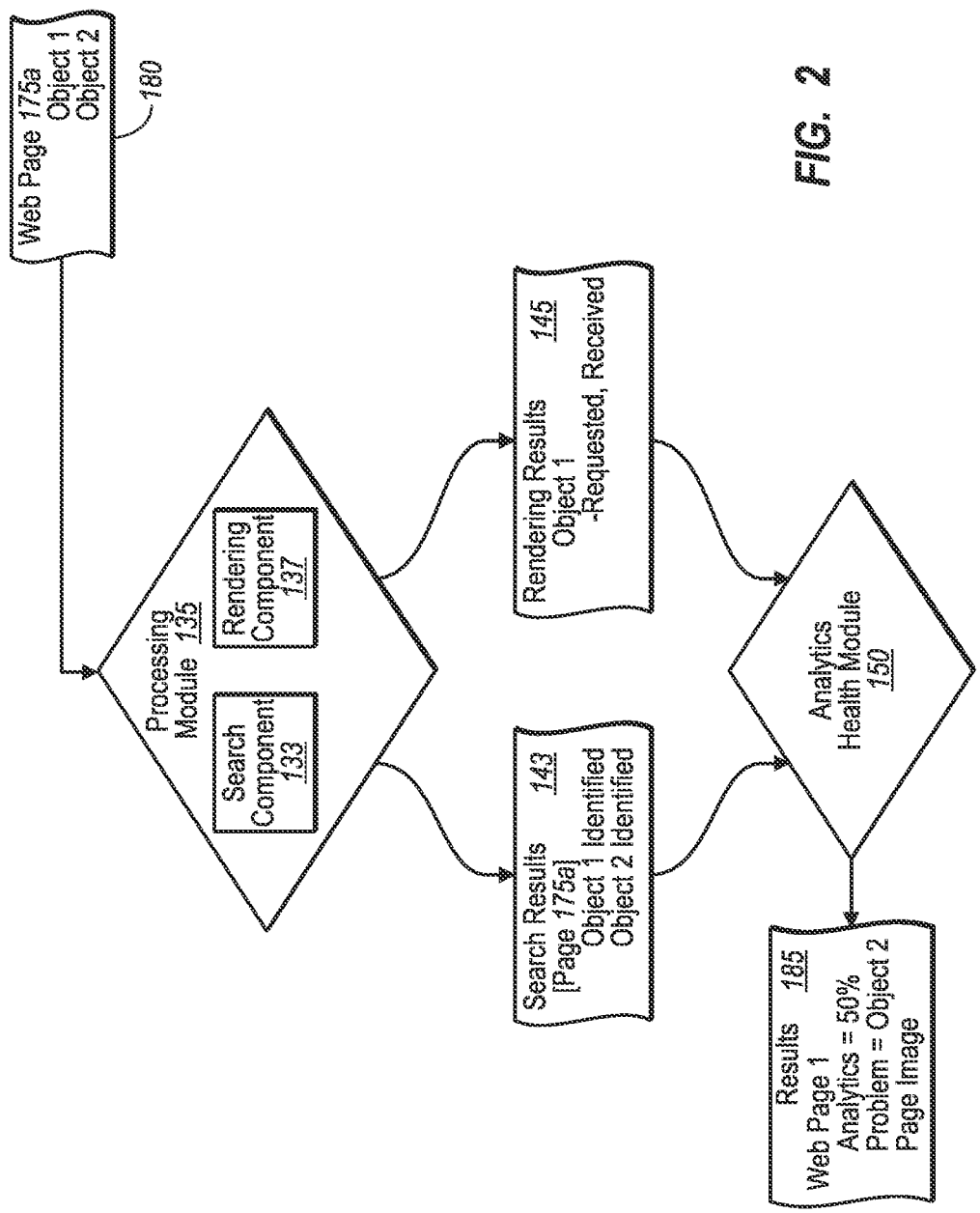
FIG. 2 illustrates additional details in which the monitoring service of FIG. 1 processes a web page of interest to determine an analytics health value.

FIG. 2 provides various details on how monitoring service 130 can determine an analytics health value for web content (or for a web page) in accordance with an implementation of the present invention. In particular, FIG. 2 shows that processing module 135 can process the source code in message 180 (e.g., for web page 175*a*) using a plurality of different components with different corresponding functions. For example, FIG. 2 shows that at least one implementation of processing module 135 can comprise one or more of a "search component" 133 and a "rendering component" 137. Each such component provides different corresponding results 143, 145, which analytics health module 150 can then review.

For example, search component 133 can be used primarily to search the raw source code text for matches to particular text strings. In particular, search component 133 can automatically search or review the received web page 175 text for specific layout and content of metatag text in the web page 175, as well as text that resembles a uniform resource locator or identifier (URL or URI). In one implementation, the search component 133 can identify source code that appears to comprise or otherwise refer to analytics code, such as references to tracking pixels. Similarly, the processing module (e.g., via rendering component 137 and/or search component 133) can automatically search for a signature that is unique to the particular web page 175.

One will appreciate that, upon identifying text that appears to comprise or refer to analytics code, such as tracking code, search component 133 can further identify any settings or variables associated with the code. For example, in the case where the analytics code comprises a reference to a tracking pixel, the source code might take on the form of "<img src="http://website.com/database/trackingpixel.jpg" height=1, width=1>", or "<object classid="http://website.com/database/trackingpixel.jpg" [multiple other variables]>". In either case, search component 133 can immediately identify a domain name (website.com) and variables included in the reference tag (<img . . . > or <object . . . >). There are of course a wide range of variables that the search component can discover in a reference such as this, and these tags are not the only types of tags that can be used to identify an analytics object such as a reference to a tracking pixel. In this case, FIG. 2 shows that processing module 135 (e.g., via search component 133) produces one or more initial results/messages 143 indicating that search component 133 identified both analytics objects 1 and 2 in web page 175*a*.

By contrast, rendering component 137 produces results (145) derived primarily or exclusively from rendering or executing the received web page 175*a* source code as though it were being rendering for display in a user interface (e.g., 110). This can occur before, after, or while search component 133 performs its functions (which result in message 143). Pursuant to this, rendering component 137 will execute each line of web page source code found in the received web page 175*a*, and all internal functions contained or otherwise referenced therein. This means that rendering component 137 will not only process instructions about color, style, font, etc. (e.g., style sheet information) found in the web page 175*a* source code to generate image information, but also execute any scripts written in the web page, and attempt to retrieve data or functions referenced via a file system or network address.

For example, upon encountering the above-mentioned tags "<img src= . . . >" or the like, rendering component 137 can cause the computer system hosting monitoring service 130 to send one or more additional requests out to the hosting system referenced in the subject domain (e.g., server 160) for the referenced file, code, or executable, etc. For code that is working properly, rendering component 137 can log its results in one or more log files (not shown). Similarly, rendering component 137 can log all of the requests it makes for remote files or functions, such as a tracking pixel. The rendering component 137 can also log the variables sent out when executing the request, and further log attempts to receive and render the tracking pixel at monitoring service 130.

In one implementation, the processing module 135 (via rendering component 137) can review the log file of requests for the presence of any analytics/tracking code requests made during execution. In the case of a tracking pixel uncovered by search component 133, if the rendering component 137 never identifies a request the uncovered tracking pixel, the monitoring service 130 (e.g., via processing module 135 or health module 150) may determine that the monitoring service 130 did not properly or completely download the web page (so that the tracking code was not downloaded). Alternatively, the monitoring service 130 may determine that received analytics/tracking code could not be understood for some reason, and thus processed for rendering.

In either case, the processing module 135 (via rendering component 137) can determine—from the point of view of a rendered web page—that the analytics code is or is not present based in part on the presence of one or more additional requests to the web server made during rendering of web page 175*b*. In the case where analytics code is misspelled, formatted incorrectly, or otherwise fails for some reason, rendering component 137 may not be able to properly execute the code. For example, FIG. 2 shows that rendering component 137 provides results 145 indicating that rendering component 137 could execute only analytics object 1 in web page 175*a*. Specifically, message 145 shows that rendering component 137 was able to request, receive, and process object 1, which in this case might comprise a reference to a tracking pixel.

FIG. 2 shows that analytics health module 150 then receives and processes the results 143 and 145 of processing by processing module 135 (via components 133 and 137). In one implementation, this involves analytics health module 150 comparing the results 143 from search component 133 with rendering results 145 from rendering component 137. For example, analytics health module 150 can identify that, for web page 175a, search component found object 1 and object 2, but since rendering component 137 could only process object 1, object 2 must therefore be defective.

As part of its processing, analytics health module 150 can assign an analytics health value for web page 175a. For example, FIG. 2 shows that analytics health module 150 assigns a relatively poor health value or score of "50%" for web page 175a, and sends this value along with any other relevant information via message 185 (see also FIG. 1). Such relevant information can comprise the health module's 150 determinations about the factors that dropped the analytics score (i.e., "Problem=Object2"). In additional or alternative implementations, monitoring service (e.g., via module 135 or 150, or both) can also provide a rendering of the web page as part of results 185. For example, FIG. 2 shows that message 185 contains information for page image associated with web page 175a. One will appreciate that this can provide the end user with visible indicia about the web page 175a at the time of processing, which might not otherwise be evident through the textual data in message 185 alone.

Of course, as previously discussed, not all failures in object execution are based on failures in the objects themselves, but can be based on the need for user-provided data to complete processing of the web page. In at least one implementation, monitoring service 130 can be configured to prompt the user for such information at any time, such as before or during processing of a given web page 175. In one implementation, monitoring service 130 can perform a scan of all web pages that the user indicated as ones the user wanted to monitor, and identify all such web pages that have fill-in forms, or form part of a workflow sequence of web pages. Before beginning formal processing of received web pages, therefore, the monitoring service 130 can thus retrieve all required information.

Specifically, website owner/operator can record one or more "flows." In a flow, the website owner can record a sequence of web pages (or set of one or more fields in a form) that the processing module 135 should review. In a flow, the website owner (and/or the monitoring service) can initiate one or more web pages that may or may not be linked to each other, or otherwise refer to each other. For example, a first web page of a website may comprise one or more optional links, or advertisements, and the website owner would like to see not only that each page in the flow comprises the appropriate tracking code, but also that each initial page in the flow properly refers to the next page in the flow. In some cases, proper flow may be required in order to reach tracking code (e.g., containing a tracking pixel) in subsequent or ending pages in the flow.

Figure 3:
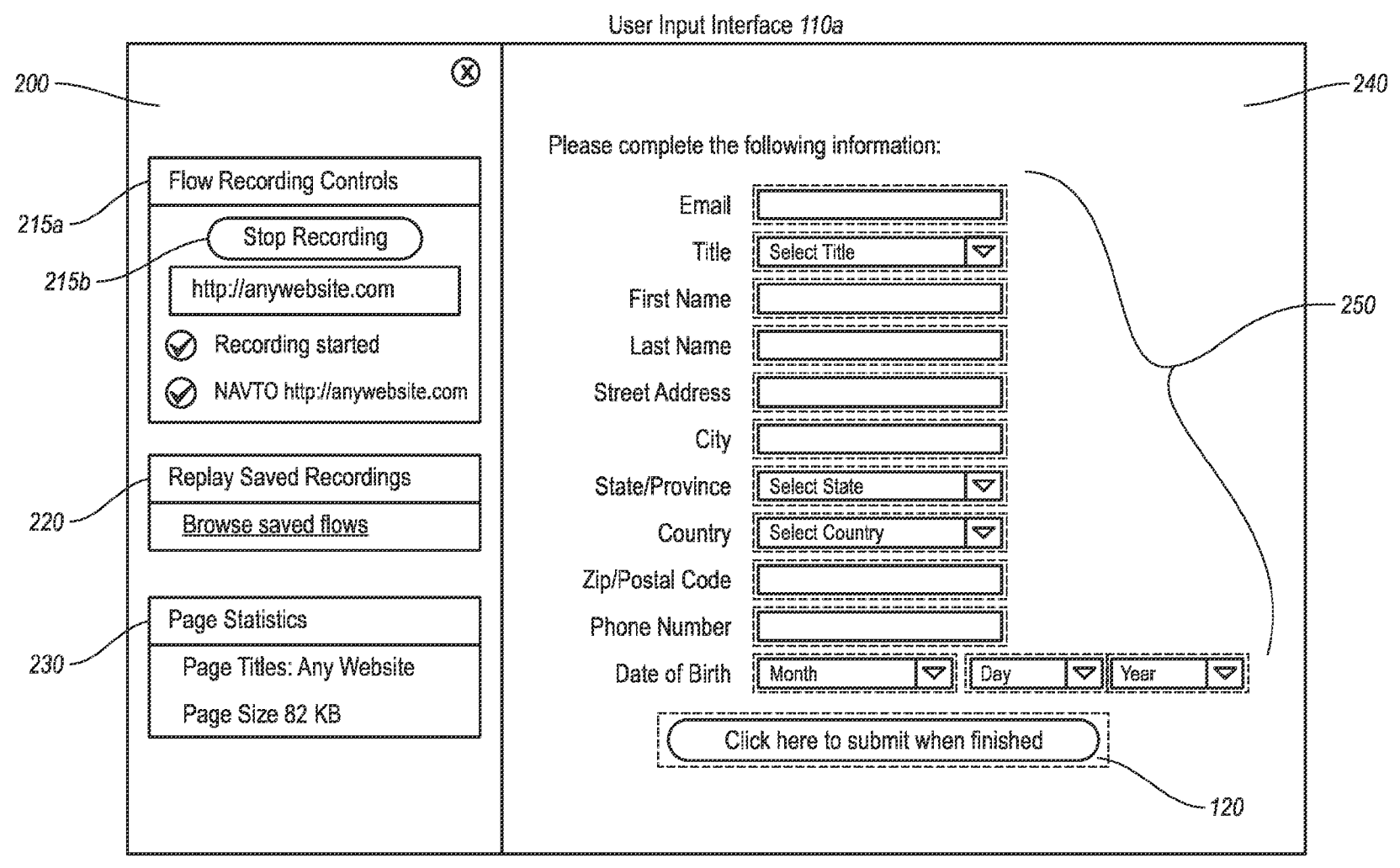

FIG. 3 illustrates an exemplary user interface 110a that can be used to obtain this type of user input. For example, FIG. 3 shows that one implementation of user input interface 110a can comprise an essentially split screen having a user control interface 200 on one screen, and a visual of the form 250 information to be filled out in an opposing web page screen 240. In one implementation, the user control interface 200 includes selectable record buttons 215a, 215b for the user to "start" or "stop" recording user input in screen 240. The control interface 200 can include other features for display or interaction, such as a selectable button 220 to replay or browse saved input (or workflows, i.e., "Browse saved flows"), which may be stored in settings store 153 (see FIG. 1). The user control interface 200 can also display one or more statistics boxes 230, which can provide various information about the input form 230, or other information associated with the corresponding web page 175.

In one implementation, when prompted with interface 110a, the end user can begin recording by selecting button 210. The end user can then fill in the various form 250 fields, such as email address, title, name, etc. In other cases, the user input may be more simple, such as a set of username and password fields, or merely a box to select and hit "continue." Upon completing the fields or selection items, the user can then click the submit button 120. The user can also hit the button 215b to end recording of the input. Monitoring service 130 can then store the complete recording of user input in settings store 153, and retrieve it when monitoring this particular web page 175.

Figure 4:
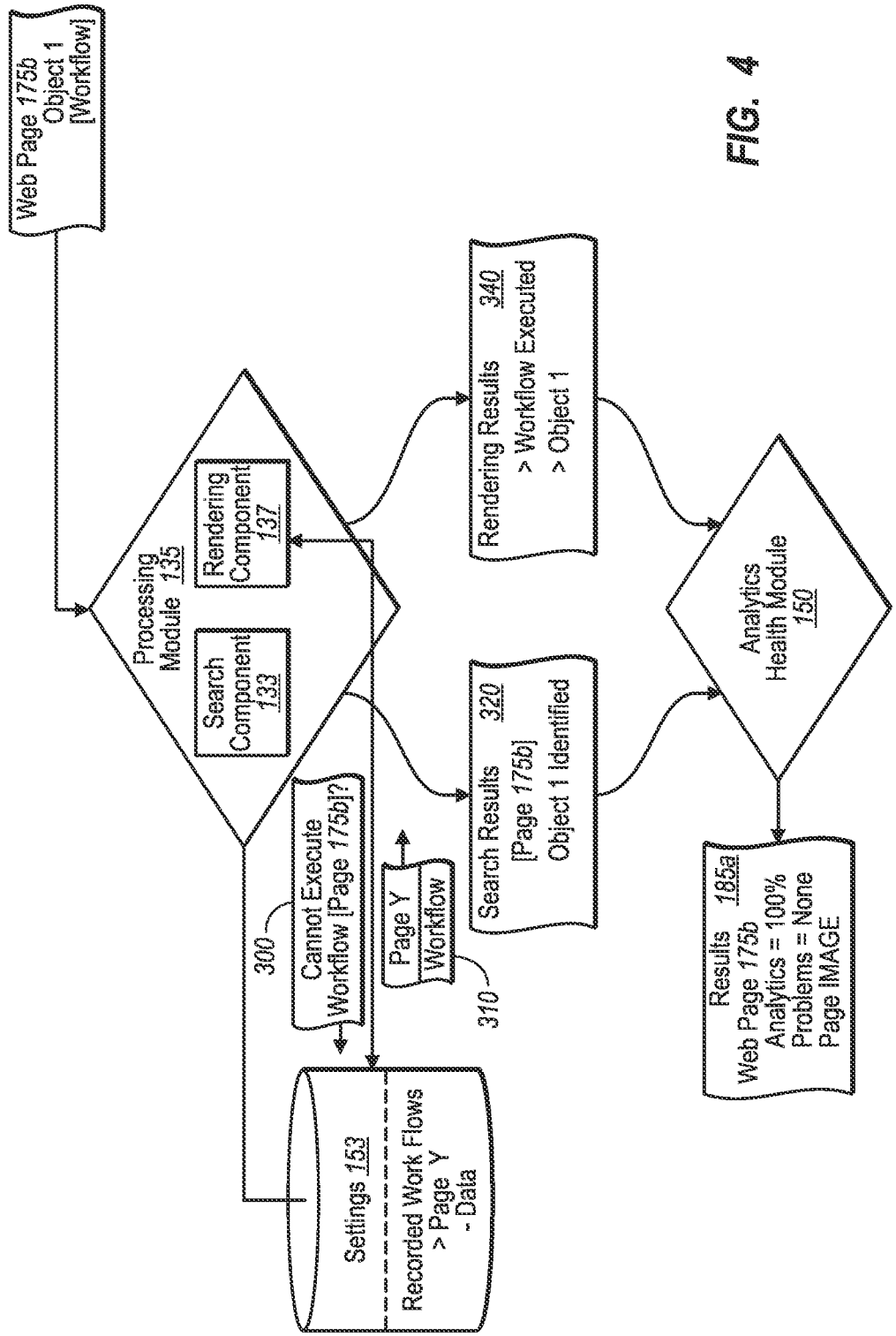
FIG. 4 illustrates additional details in which the monitoring service of FIG. 1 processes a web page of interest in conjunction with user input for one or more forms or workflows to determine an analytics health value.

Along these lines, FIG. 4 illustrates a schematic diagram that is similar to that shown in FIG. 2, but in which monitoring service 130 needs user input to complete processing. For example, FIGS. 1 and 4 show that web page 175b comprises analytics object 1, much like with web page 175a. In this case, FIG. 4 shows that search component 133 of processing module 133 identifies the presence of object 1 in the results 320 that it provides to analytics health module 150. Rendering component 137, however, cannot process object 1 since it is associated with a "workflow," and thus can only be accessed and/or executed upon completion of the workflow.

Accordingly, FIG. 4 shows that processing module 135 communicates with settings store 153 via messages 300 and 310 to find data (e.g., recorded fill-in data) appropriate for the web page 175b. Upon receiving message 310, rendering component 137 can use the data as needed, and complete rendering of web page 175a. In the illustrated case, this means that rendering component 137 was able to access, retrieve, and/or process object 1.

FIG. 4 thus shows that processing module 135 provides rendering results in message 340 to analytics health module 150. In particular, message 340 indicates that processing module 135 was able to execute the received workflow, and further to execute object 1. As before, analytics health module 150, in turn, processes this information in conjunction with the information 320 provided from the search component 133. In the illustrated case, since the results of searching and rendering were essentially consistent, analytics health module 150 can provide a good analytics health value for web page 175b.

For example, FIG. 4 shows that analytics health module 150 sends to client message 185a, which provides a health analytics score of "100%" for web page 175b. Furthermore, as also described with respect to FIG. 4, analytics health module 150 provides in results 185a an image rendered for the page. Accordingly, as similarly described for FIG. 2, the user can receive visible indicia along with the textual indications that processing of analytics objects (i.e., object 1 in this case) worked appropriately for web page 175b.

Figure 6:
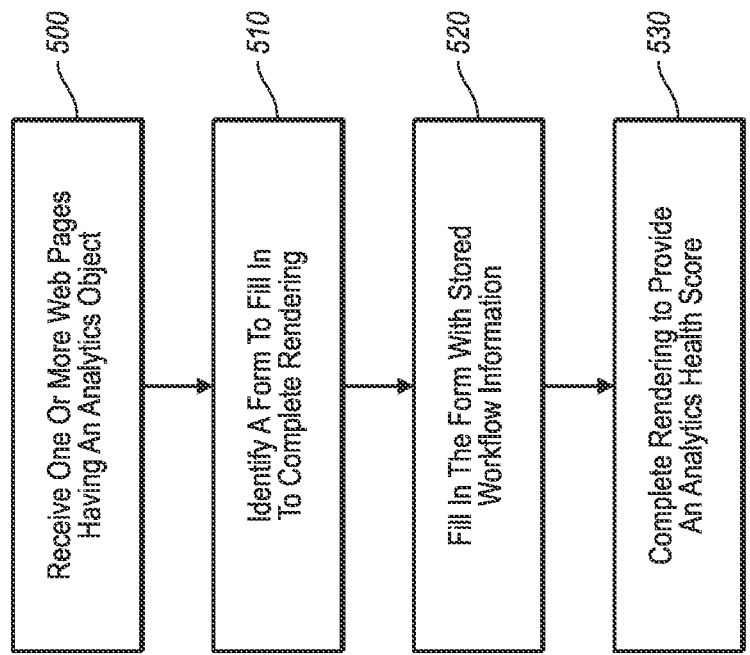
FIG. 6 illustrates a flowchart comprising one or more acts in a method of automatically using stored workflow information to identify the presence and function of the analytics code on one or more web pages of interest.
Figure 5:
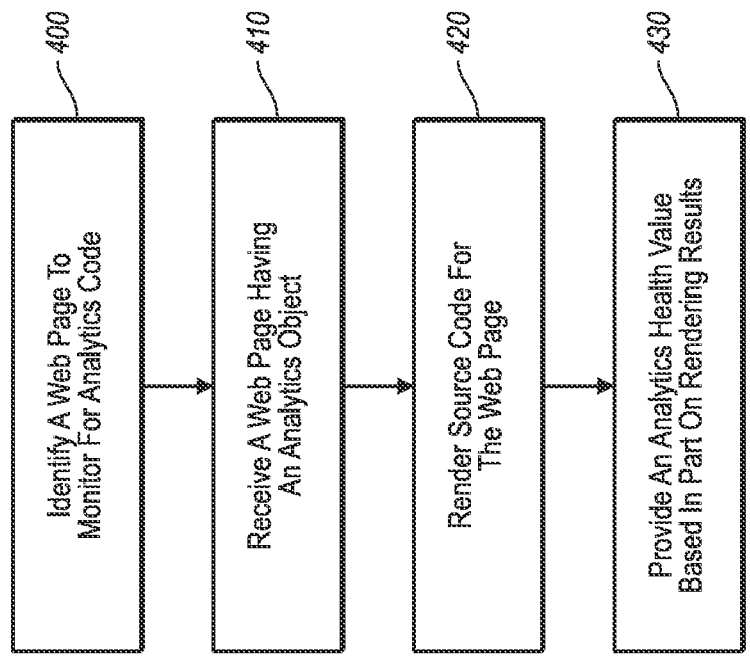
FIG. 5 illustrates a flowchart comprising one or more acts in a method of automatically monitoring the presence and function of the analytics code on one or more web pages of interest.

FIGS. 1 through 4 thus provide a number of components and modules that can be used to effectively, efficiently, and correctly ascertain health of analytics code on a given web page. In addition to the foregoing, implementations of the present invention can also be described in terms of methods comprising one or more acts for accomplishing a particular result. For example, FIG. 5 illustrates a flowchart of a method of automatically monitoring the presence and function of the analytics code on one or more web pages of interest, while FIG. 6 illustrates a flowchart of a method of automatically using stored workflow information to identify the presence and function of the analytics code on one or more web pages of interest. The acts of FIGS. 5 and 6 are described below with respect to the schematics and components in FIGS. 1 through 4.

For example, FIG. 5 shows that a method of monitoring the presence and function of analytics code can comprise an act 400 of identifying a web page to monitor for analytics code. Act 400 includes identifying a set of one or more web pages to monitor for an analytics health value. For example, FIG. 1 shows that an end user supplies web page or website information through a user interface 110, and that monitoring service 130 receives this information via one or more messages 125.

FIG. 5 also shows that the method of monitoring can comprise an act 410 of receiving a web page having an analytics object. Act 410 includes receiving from a web server at least one of the one or more web pages, wherein the at least one web page comprises source code related to one or more website analytics objects. For example, FIGS. 1 and 2 show that monitoring service 130 receives (e.g., via message 155) web page 175a for processing. Web page 175a, in turn, comprises analytics objects 1 and 2 therein.

In addition, FIG. 5 shows that the method of monitoring can comprise an act 420 of rendering source code for the web page. Act 420 can include rendering the source code of the at least one web page thereby creating rendering results. For example, FIG. 2 shows that processing module 135 processes the received web page 175a, and that rendering component 137 produces rendering results 145 for review by analytics health module 150.

Furthermore, FIG. 5 shows that the method of monitoring can comprise an act 430 of providing an analytics health value based in part on rendering results. Act 430 includes automatically providing an analytics health value for the at least one web page based at least in part on the rendering results. For example, FIGS. 2 and 4 show that analytics health module 150 processes rendering results 145 or 340 to provide results 185, 185a to the end user. The results 185, 185a comprise an analytics score, which indicates the extent to which identified analytics code works or executes as indicated or expected.

In addition to the foregoing, FIG. 6 shows that a method of using stored workflow information to identify the presence and function of analytics code can comprise an act 500 of receiving one or more pages having an analytics object. Act 500 includes receiving from a web server at least one of the one or more web pages, wherein the at least one web page comprises source code related to one or more website analytics objects. For example, FIG. 4 shows that processing module 135 (part of monitoring service 130) receives web page 175b having (or referring to) an analytics "object 1" therein.

FIG. 6 also shows that the method of using workflow information can comprise an act 510 of identifying a form to fill in to complete rendering. Act 610 includes identifying one or more forms that need to be completed before at least one of the one or more web pages can be rendered completely. For example, FIG. 4 shows that, upon processing web page 175b, processing module 135 (in response to rendering component 137) identifies a need to send a request for workflow information. In such a case, rendering component 137 may have identified a form requiring username and password information to complete rendering, or may have encountered a more complex workflow requiring input on several forms over several successive web pages. Accordingly, FIG. 4 shows that processing module 135 sends message 300 to settings store 153. One will appreciate that message 300 can additionally or alternatively comprise instructions for a user interface (e.g., 110a) so that an end user can supply the needed form/workflow information at client 100.

In addition, FIG. 6 shows that the method of using workflow information can comprise an act 520 of filling in the form with stored workflow information. Act 520 includes automatically filling in the one or more forms with data corresponding to one or more stored workflows. For example, FIG. 4 shows that processing module 135 receives message 310 comprising the information previously recorded (or recently filled in) by the user.

Furthermore, FIG. 6 shows that the method of using workflow information can comprise an act 530 of completing rendering to provide an analytics health score. Act 530 includes automatically providing an analytics health value for one of the web pages based at least in part on one or more website analytics objects that were rendered as a result of filling in the one or more forms. For example, FIG. 4 shows that processing module 135 provides (via rendering component 137) results 340 indicating that the workflow in web page 175b was executed, and that object 1 was identified and executed. Similarly, FIG. 5 shows that analytics health module 150 provides message 185a, comprising an analytics health value of "100%" for web page 175b, which value was determined based at least in part on the results 340 from rendering component 137.

Accordingly, FIGS. 1 through 6 provide a number of component, schematics, modules, and mechanisms that allow an organization to effectively and accurately determine the analytics health of one or more web pages in a website. In addition, due at least in part to the potential for real-time monitoring, implementations of the present invention can be used to provide rapid and immediate analytics results for organizations. Such inventive mechanisms and components can provide a great advantage to organizations, particularly where the organization's success in a product or service relies on website discovery or usage by potential customers or clients.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment, a method for automatically monitoring whether a web page of interest is correctly configured to execute and track the number of user requests thereof, the method comprising:
   receiving a web address associated with at least one webpage, wherein the at least one webpage comprises source code related to one or more website analytics objects;
   identifying, within the source code of the at least one webpage, text associated with a website analytics objects;
   analyzing the text to determine at least one predicted behavior of the website analytics object;
   rendering the source code of the at least one webpage;
   recording one or more behaviors of the rendered source code of the one or more website analytics objects; and
   comparing the at least one predicted behavior of the website analytics object and the recorded one or more behaviors of the rendered source code of the one or more website analytics objects.

2. The method as recited in claim 1, further comprising identifying one or more settings for monitoring the presence and function of the one or more website analytics objects on the at least one webpage.

3. The method as recited in claim 2, wherein the one or more settings comprise a request to monitor the presence and function of the one or more website analytics objects in real-time, the method further comprising repeating receiving the web address associated with at least one webpage and rendering the source code of the at least one web page after an interval of 10 minutes or less.

4. The method as recited in claim 1, further comprising:
   separately searching source code of the at least one web page for one or more website analytics objects;
   wherein the search is performed without executing or rendering the source code.

5. The method as recited in claim 1, further comprising automatically determining that an expected website analytics objects on the at least one web page could not be executed.

6. The method as recited in claim 5, further comprising providing a low analytics health value for the at least one web page.

7. The method as recited in claim 5, wherein the act of automatically determining that the analytics object could not be executed comprises:
   identifying that the website analytics objects comprises one or more network requests for a file; and
   determining that, when rendering the source code of the at least one web page, the request for the file was not made.

8. The method as recited in claim 5, further comprising:
   automatically determining that user input is needed to complete processing of the at least one web page; and
   sending one or more requests for pre-recorded user input in one or more forms.

9. The method as recited in claim 8, further comprising:
   completing rendering of the source code of the least one web page with the user input; and
   executing the website analytics objects.

10. The method as recited in claim 1, wherein the website analytics objects comprises code for a tracking pixel.

11. The method as recited in claim 1, wherein:
    the one or more website analytic objects comprises a signature for the at least one web page; and
    the signature comprises a predetermined arrangement of web page source code content for the at least one web page.

12. The method as recited in claim 11, wherein source code of that at least one webpage comprises on one or more of a base domain, a transfer protocol, a file path, or a query string.

13. At a monitoring system in a computerized environment comprising one or more websites having one or more web pages and one or more sets of analytics code on one or more of the web pages, a method of automatically using stored workflow information to identify the presence and function of the analytics code on one or more web pages of interest, comprising:
    receiving a web address associated with at least one webpage, wherein the at least one webpage comprises source code related to one or more website analytics objects;
    analyzing the source code to determine at least one predicted behavior of a website analytics object;
    identifying one or more forms in the at least one web page that need to be completed before at least one of the one or more web pages can be rendered completely;
    automatically filling in the one or more forms with data corresponding to one or more stored workflows;
    rendering the source code of the at least one webpage;
    recording one or more behaviors of the rendered source code of the one or more website analytics objects; and
    comparing the at least one predicted behavior of the website analytics object and the recorded one or more behaviors of the rendered source code of the one or more website analytics objects.

14. The method as recited in claim 13, further comprising identifying one or more settings for monitoring the presence and function of the one or more website analytics objects on the at least one webpage.

15. The method as recited in claim 14, wherein the one or more settings comprise a request to monitor the presence and function of the one or more website analytics objects in real-time, the method further comprising repeating receiving the web address associated with at least one webpage and rendering the source code of the at least one web page after an interval of 10 minutes or less.

16. The method as recited in claim 13, further comprising:
    separately searching source code of the at least one web page for one or more website analytics objects;
    wherein the search is performed without executing or rendering the source code.

17. The method as recited in claim 13, further comprising automatically determining that an expected website analytics object on the at least one web page could not be executed.

18. The method as recited in claim 17, further comprising providing a low analytics health value for the at least one web page.

19. The method as recited in claim 17, wherein the act of automatically determining that the website analytics object could not be executed comprises:
- identifying that the website analytics object comprises one or more network requests for a file; and
- determining that, when rendering the source code of the at least one web page, the request for the file was not made.

20. In a computerized environment comprising one or more websites having one or more web pages and one or more sets of analytics code on one or more of the web pages, a computer program product storage device comprising computer-executable instructions that, when executed, cause one or more processors in a computerized system to perform a method comprising:
- receiving a web address associated with at least one webpage, wherein the at least one webpage comprises source code related to one or more website analytics objects;
- identifying within the source code of the at least one webpage text associated with a website analytics objects;
- analyzing the text to determine at least one predicted behavior of the website analytics object;
- rendering the source code of the at least one webpage;
- recording one or more behaviors of the rendered source code of the one or more website analytics objects; and
- comparing the at least one predicted behavior of the website analytics object and the recorded one or more behaviors of the rendered source code of the one or more website analytics objects.

* * * * *